July 20, 1965  W. F. MOYERS  3,195,906
COMPOSITE SEALING RING WITH COMPRESSION STOP
Filed March 28, 1961

INVENTOR.
WILLIAM F. MOYERS
BY
John N. Wolfram
ATTORNEY

United States Patent Office 3,195,906
Patented July 20, 1965

3,195,906
COMPOSITE SEALING RING WITH
COMPRESSION STOP
William F. Moyers, Los Angeles, Calif., assignor to
Parker-Hannifin Corporation, Cleveland, Ohio, a
corporation of Ohio
Filed Mar. 28, 1961, Ser. No. 98,557
4 Claims. (Cl. 277—180)

This invention relates to sealing rings of the type to be clamped between two members having opposed faces to be sealed, such as flanged pipes, or the like.

The invention is an improvement in the type of sealing ring described in United States Patent 2,717,793. This type of sealing ring comprises a metal annulus adapted to be clamped between opposed flat faces of pipe flanges or the like. The annulus has grooves on each side thereof which contain resilient rubber-like material for sealingly engaging the flange faces. The metal annulus serves as a stop to limit the clamping movement of the flanges and is thus required to be relatively rigid. The opening through the annulus for many installations should be exactly the same diameter as the inside diameter of the pipe and in alignment therewith so that there will be no pockets or projections in the flow path into or upon which foreign material may lodge, or which would result in increased pressure drop therethrough. The rubber-like material, being resilient and deformable, is wholly contained within its groove and is spaced away from the flow path so that the rubber, upon deformation, cannot form projections or pockets adjacent the flow path.

In some instances, it is desirable that the annulus be made of a plastic so as to take advantage of either the non-electrical conductive and/or low heat transfer properties thereof. In other cases, plastic is desirable because metals may not be impervious to the particular fluid to be conveyed through the pipes.

Many attempts have been made to make such sealing rings with a plastic substituted for the metal annulus, but in all cases it has been found that plastics to which synthetic rubber could be satisfactorily molded were not impervious to the fluids to be conveyed or, conversely, if the plastic were impervious, the synthetic rubber could not be satisfactorily molded to the plastic. It has been found, for example, that synthetic rubber can be satisfactorily molded to such plastics as glass filled nylon, glass filled melamine, fabric base phenolic and paper base phenolic, but that these plastics, for example, are not satisfactory for use in fluids such as concentrated acids, phenols, and alkalis. However, these plastics may be used for outer ring 24 of the present invention since the plastic is isolated from contact with the fluid by the synthetic rubber portion of the seal and thus not subject to deterioration therefrom.

The present invention solves the above problems by utilizing plastics and metals to which rubber can be satisfactorily molded but using the plastic or metal only for the outer portion of the sealing ring where it will be isolated from the fluid, and by forming both the inner and sealing portion of the ring of rubber-like material and in such a manner that deformation of the sealing portion of the rubber will not deform the inner portion. Thus, formation of undesirable projections or pockets at the inner diameter of the inner portion adjacent the flow stream when the joint is made up is avoided.

Another object is to provide a seal of the type described in which the inner and sealing portions are made of rubber-like material, the outer portion is metal or plastic, and the rubber-like portion is securely attached to the plastic or metal.

In another form of the invention it is an object to provide a combination sealing ring in which the outer portion of the ring is of rubber-like material and the inner portion is metal or plastic.

Other objects of the invention will be apparent from the description and from the drawings in which.

Figure 1:
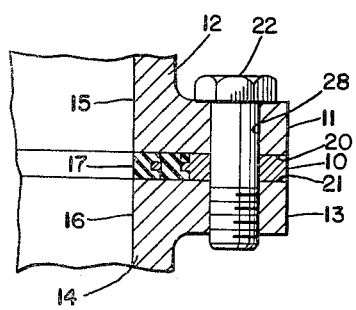
FIG. 1 is a fragmentary cross section view of a flanged pipe connection with the sealing ring.

As shown in FIG. 1, the sealing ring is generally indicated at 10 and may be used, for example, in sealing the joint between flange 11 of pipe 12 and flange 13 of pipe 14. Bores 15 and 16 through the pipes are of the same diameter and in alignment with each other. Central opening 17 in sealing ring 10 is of the same diameter as bores 15 and 16 and in alignment therewith. The sealing ring 10 is clamped between opposed flat faces 20 and 21 of flanges 11 and 13 and the joint is made tight by means of bolts 22.

Figure 2:
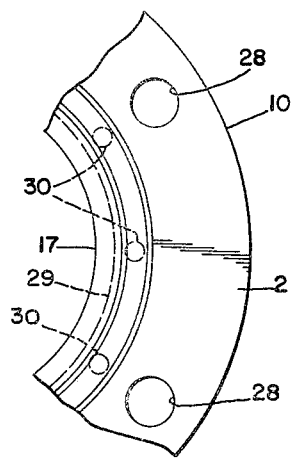
FIG. 2 is a partial plan view of the sealing ring.
Figures 3, 4:
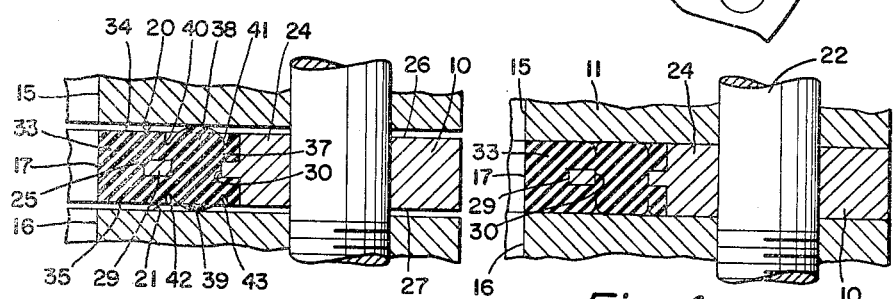
FIG. 3 is a fragmentary section view of the pipe flange connection with the parts in loosely assembled condition and FIG. 4 is an enlarged fragmentary section view of the pipe flange joint with the parts in the tightly assembled condition.

As shown in FIGS. 2 and 3, sealing ring 10 includes an outer ring 24 of rigid material, such as plastic or metal, and an inner ring 25 of less rigid material which is rubber-like so as to be deformable and resilient.

Outer ring 24 has flat end faces 26, 27 adapted to be engaged by flange faces 20, 21. Since the outer ring 24 is of rigid material, tight engagement of the flange faces with the outer ring will limit the amount which the flanges 11 and 13 may be moved toward one another by tightening of screws 22.

Outer ring 24 has a series of openings 28 for receiving screws 22. On its inner periphery ring 24 has a relatively thin annular tongue portion 29 extending radially inwardly and which is pierced at circumferentially spaced points to provide a series of openings 30 therethrough.

Inner ring 25 is preferably formed by molding it in place on outer ring 24. An alternate method is to mold the inner ring separately and to cement it to outer ring 24. Openings 30 are utilized when inner ring 25 is molded directly onto outer ring 24 and become filled with rubber-like material which is integral with the remaining portion of the inner ring and forms a mechanical bond for assisting in retention of inner ring 25 upon the outer ring. In addition to this mechanical bond, the molding operation is preferably such that there will be good adhesion between the rubber-like inner ring 25 and outer ring 24.

Inner ring 25 has a first portion 33 which is of substantial radial width and whose inner diameter 17 is the same as the diameter of bores 15, 16 and for precise alignment therewith, as aforesaid. The width of first portion 33 is preferably at least as wide as the thickness thereof so as to be substantially resistent to deformation which might decrease the diameter or opening 17 or which might distort the contour of the same. Furthermore, the thickness of first portion 33 is substantially the same as the thickness of outer ring 24 so that flap or ungrooved end surfaces or portions 34, 35 will just contact flange surfaces 20, 21 when the joint is made up tight and thus avoid distortion or inward bulging on opening 17 due to clamping action of the flanges against surfaces 34, 35. It is understood, of course, that the rubber-like material of inner ring 25 is resilient and distortable but relatively incompressible.

Inner ring 25 also has a second portion generally designated 37 extending on opposite sides of tongue 29. Each end of second portion 37 is contoured to form annular ribs 38, 39 with adjacent grooves 40, 41, 42 and 43.

As shown in FIG. 3 rib 38 projects axially beyond the common plane of surfaces 34 and 26 when the sealing ring 10 is in its free or unclamped condition. Likewise, rib 39 extends axially beyond the common plane of faces 27 and 35. Grooves 40, 41, 42 and 43 extend below the planes of surfaces 34, 26 and 35, 27.

When the sealing ring 10 is loosely assembled between the flanges, as illustrated in FIG. 3, ribs 38, 39 make initial contact with the respective flange face 20, 21. Upon tightening screws 22, flanges 11 and 13 are drawn toward each other and pressed on ribs 38, 39 to deform the same so as to displace some of the material thereof into the space initially defined by grooves 40, 41, 42, and 43. The volume of that portion of rib 38 which projects initially beyond the plane of surfaces 34, 26 is about equal or just slightly less than the volume of that portion of grooves 40, 41 projecting below the level of surfaces 34, 26 so that such grooves will be large enough to accept all of the displaced material when the joint is made tight. The same is true of the projecting portion of rib 39 with respect to grooves 42, 43. This, plus the fact that first portion 33 of the inner ring is of substantial width so as to resist deformation in the vicinity of opening 17 due to stresses within the rubber-like mass in the vicinity of the grooves and ribs, results in no appreciable inward bulging or distortion of opening 17 whereby the latter remains in its condition of initial alignment with bores 15 and 16.

The fact that first portion 33 is of the same thickness as outer rigid ring 21 also helps to avoid inward bulging or distortion of opening 17 because the flanges will just contact the same and not apply a deforming pressure thereto. Furthermore, first portion 33 completely fills up the space between the two flanges when the latter are tight against outer ring 24 so as to avoid any clearances between first portion 33 and the flanges in the vicinity of opening 17 to prevent formation of pockets or spaces into which foreign material in the fluid conveyed by the pipes may collect.

Figure 5:
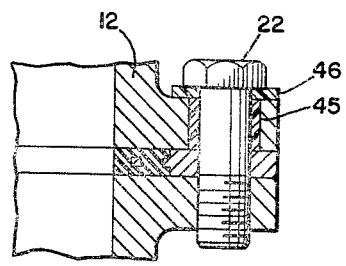
FIG. 5 is a fragmentary cross section view of a flanged pipe joint with a non-electrically conductive form of the seal.

When outer ring 24 is made of a plastic and inner ring 25 is made of synthetic rubber the sealing ring will pass less heat between flanges 11 and 13 than when a metal outer ring is used. Also, the sealing ring 10 will be a good electrical insulator between the flanges. When the latter property is of importance, the flanges may be further insulated from each other by providing bushing 45 and washer 46 of insulating material to isolate screw 22 from electrical contact with flanges pipe 12, as shown in FIG. 5.

Figure 6:
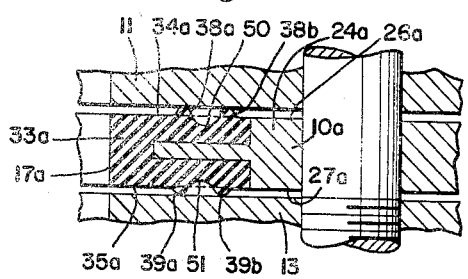
FIG. 6 is a fragmentary cross section view of a modified form of the seal loosely assembled between two pipe flanges.

In the modification shown in FIG. 6, the inner ring 33a is provided with a pair of annular ribs 38a, 38b, and 39a, 39b on opposite sides thereof and with grooves 50 and 51 therebetween. That portion of groove 50 projecting below the common plane of ring surfaces 34a and 26a is the same or slightly greater in volume than the volume of that portion of ribs 38a, 38b which projects above such common plane whereby material displaced by deformation of ribs 38a, 38b by clamping contact with flanges 11 and 12 will be completely received within such grooves. The same is true of groove 51 with respect to ribs 39a, 39b.

Figure 7:
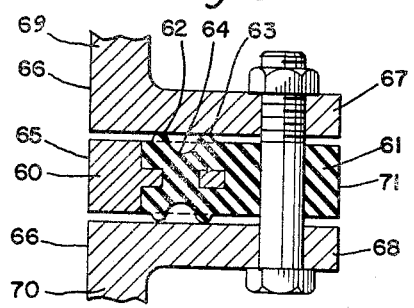
FIG. 7 is a fragmentary cross section of still another modified form.

In the modification shown in FIG. 7 the inner ring 60 is metal or relatively rigid plastic and the outer ring 61 is of rubber-like material. The deformable ribs 62, 63 and groove 64 are formed in the rubber-like part and are proportioned as described in connection with ribs 38a, 38b, and groove 50 of FIG. 6.

In this instance the metal or plastic portion 60 has an inside diameter 65 coinciding exactly with the inside diameters 66 of flange members 67, 68 and, of course, there will be no bulging or distortion of diameter 65 during makeup of the joint to alter this relation or to cause ledges or pockets in the flow stream. The outer diameter 71 of the rubber-like portion is spaced far enough from lips 62 and 63 so that it is unaffected in dimension and contour by deformation of such lips. This arrangement is particularly useful when the fluid within the conduits 69, 70 is sub-atmospheric, or is below the pressure of ambient fluid.

I claim:

1. A sealing ring for use between a pair of members having opposed faces movable toward each other, said sealing ring comprising an outer ring of rigid material adapted to be clamped between said faces and serving when so clamped to limit said movement of said faces toward each other, an inner ring of deformable resilient material radially inward of said outer ring and attached thereto, said inner ring having a first portion of substantial width, said inner ring also having a second portion including a part between said first portion and said outer ring of greater thickness than said outer ring whereby said part will be sealingly engaged and deformed by said faces in advance of said engagement of said outer ring by said faces, and each of said rings defining a peripheral boundary of said sealing ring with said inner ring having an opening therethrough, said second portion including a pair of grooves on each end thereof on opposite sides of said part for receiving displaced material from said part upon said deformation thereof and said first portion being of a width at least as great as the thickness thereof whereby said deformation of said part is ineffective to cause appreciable displacement of the material of said first portion adjacent said opening therein.

2. A sealing member for use between a pair of members having opposed surfaces movable toward each other, said sealing member comprising a first ring of rigid material adapted to be clamped between the pair of members and serving when so clamped to limit the movement of the opposed surfaces toward each other, a second ring of deformable resilient material radially disposed with respect to said first ring and attached thereto, said second ring having first and second portions of substantially similar width and thickness, the first portion being of the same thickness as said first ring, the second portion having a part between the first portion and the first ring of greater thickness than the first ring and the first portion, the second portion also having a groove adjacent said part for receiving displaced material from said part upon deformation thereof, and the first portion and the first ring defining continuous peripheral boundaries of said sealing member.

3. A sealing member for use between a pair of members having opposed surfaces movable toward each other, said sealing member comprising a first ring of rigid material adapted to be clamped to limit the movement of the opposed surfaces toward each other, a second ring of deformable resilient material radially disposed with respect to said first ring and attached thereto, said second ring having first and second portions of substantially similar width and thickness, the second portion having a part between the first portion and the first ring of greater thickness than the first ring, and the first portion and the first ring defining unbroken peripheral boundaries of said sealing member, said second portion including a pair of grooves on opposite sides of said part for receiving displaced material from said part upon the deformation thereof.

4. The sealing member as defined in claim 3 wherein the width of said part is less than the width of an ungrooved portion of said first portion.

(References on following page)

References Cited by the Examiner

UNITED STATES PATENTS

| | | | |
|---|---|---|---|
| 2,383,570 | 8/45 | Sellew | 277—211 X |
| 2,717,793 | 9/55 | Nenzell | 288—23 |
| 2,752,579 | 6/56 | Caldwell et al. | 174—85 X |
| 2,795,444 | 6/57 | Nenzell | 277—180 |
| 3,061,321 | 10/62 | Smith | 277—180 |

FOREIGN PATENTS

| | | |
|---|---|---|
| 1,105,990 | 7/55 | France. |
| 836,197 | 6/60 | Great Britain. |
| 554,738 | 1/57 | Italy. |

EDWARD V. BENHAM, *Primary Examiner.*

MORRIS M. FRITZ, SAMUEL ROTHBERG,
*Examiners.*